3,384,581
SOLID LUBRICANT AND PIGMENT
DISPERSIONS
James B. Peace, Modbury, Devon, England, assignor to Acheson Industries, Inc., Port Huron, Mich., a corporation of Michigan
No Drawing. Filed June 9, 1967, Ser. No. 644,832
10 Claims. (Cl. 252—29)

ABSTRACT OF THE DISCLOSURE

A stabilized dispersion composition for use as a lubricating oil, or other pigmented dispersion, comprising a particulate material dispersed in a fluid or liquid organic material and containing a stabilizing agent to contain the particulate material in dispersed form, said stabilizing agent being an ethylene-propylene copolymer or terpolymer; and the method of preparing said composition.

Background of the invention

This invention relates to methods for producing stable dispersions of solid lubricant particles and tinctorial pigment particles in nonaqueous carrier fluids and stabilizers for use in preparing these stable dispersions.

By the term dispersion as used herein it is meant a system of minute solid particles relatively distinct from one another and generally suspended in a fluid or liquid medium. This dispersion may be either in highly liquid form, or in a concentrate or paste form.

For many years, dispersions of solid lubricant particles in oils and other nonaqueous carriers have been prepared for various lubricating applications. Such dispersions have found utility, but there are many potentially interesting applications where agglomeration and separation of the lubricant particles from the carrier medium have been pronounced, thus preventing practical use of such dispersions for these purposes. This settling condition or lack of stability has been a constant and major problem at high operating temperatures. To improve the stability of these lubricant fluid dispersions, various stabilizing agents and processing methods have been suggested, however, none of these suggested solutions have been completely satisfactory, and in fact, many have been deficient. Similarly, the preparation of dispersions of tinctorial pigments is an old art, which has been subject to the same problems of agglomeration and separation of the pigments from the carrier medium. As with solid lubricant particle dispersions, various stabilizing agents and processing methods have been proposed to alleviate these problems, however, none of the previous proposals have been completely satisfactory. Among the solutions proposed have been the use a wide variety of surfactants such as organic amines, cellulosic ethers, metal naphthenates, metal soaps, and the like, as well as the more conventional surface active agents such as phenol condensates and the like.

Objects

Accordingly, the object of the present invention is to provide an improved stabilized dispersion composition as well as the method of preparing said composition.

Other objects, features and advantages of the present invention will become apparent from the subsequent description and the appended claims.

Summary of the invention

In contrast with the prior practices for preparing pigmented, nonaqueous, fluid dispersions, I have discovered that, using the herein disclosed stabilizing agent, extremely stable dispersions of particulate materials as disclosed hereinbelow can be prepared without addition of the normally unsuitable surface active agents and the complicated milling procedures unsatisfactorily employed earlier.

The new polymeric materials which have been found to be satisfactory for use as stabilizing agents are polymers of the polymethylene type with a saturated main carbon chain, with methyl groups substituted for hydrogen at an overall average substitution rate of about one methyl for every four carbon atoms in the chain, or polymers of the same type having, in addition to the methyl substitution, occasional substitution of unsaturated diene groups. The combined substitution of diene groups and methyl groups when both are present should still be such that the substitution rate on the main carbon chain averages about one substitution for every four carbon atoms.

Broadly described, the dispersion of this invention comprises: (a) at least one solid particulate material, present in an amount between about 0.001% and about 75% by weight of the composition, said particulate material being selected from the group consisting of: (1) lubricant particles selected from the group of molybdenum disulfide, tungsten disulfide, boron nitride and lead sulfide, or (2) pigment and filler particles selected from the group of titanium dioxide, carbon black, talc and mica, (b) a polymethylene polymer having a saturated main carbon chain, said polymer being selected from the group consisting of (1) copolymers of ethylene and propylene, said copolymers containing a methyl group substitution rate on the chain averaging about one methyl for every four carbon atoms in said chain, (2) terpolymers of ethylene, propylene and an unconjugated diene monomer, said terpolymers containing substituted groups on the chain averaging about one group for every four carbon atoms in said chain, said groups being selected from the class consisting of said diene and methyl groups, and (3) mixtures of said copolymers and terpolymers, said polymethylene polymer being present in an amount between about 5% and about 100% by weight of the particulate material present, said polymer having a viscosity of at least about 10 poises, (c) a fluid carrier material as the balance of the composition.

From a method aspect, broadly described, this invention comprises a method of producing a stable dispersion composition comprising: (a) at least one solid particulate material, present in an amount between about 0.001% and about 75% by weight of the composition, said particulate material being selected from the group consisting of: (1) lubricant particles selected from the group of molybdenum disulfide, tungsten disulfide, boron nitride and lead sulfide, or (2) pigment and filler particles selected from the group of titanium dioxide, carbon black, talc and mica, (b) a polymethylene polymer having a saturated main carbon chain, said polymer being selected from the group consisting of (1) copolymers of ethylene and propylene, said copolymers containing a methyl group substitution rate on the chain averaging about one methyl for every four carbon atoms in said chain, (2) terpolymers of ethylene, propylene and an unconjugated diene monomer, said terpolymers containing substituted groups on the chain averaging about one group for every four carbon atoms in said chain, said groups being selected from the class consisting of said diene and methyl groups, and (3) mixtures of said copolymers and terpolymers, said polymethylene polymer being present in an amount between about 5% and about 100% by weight of the particulate material present, said polymer having a viscosity of at least about 10 poises, (c) a fluid carrier material as the balance of the composition, said method comprising the steps of: (A) mixing said particulate material with said polymethylene polymer to form a mixture, and (B) diluting said mixture with said fluid carrier material.

Description of preferred embodiments

The specific polymeric materials for use as the stabilizing agent are the elastomeric compounds produced by the copolymerization of ethylene and propylene monomers, commonly known as ethylene-propylene copolymers. A preferred copolymer of this type would have approximately equimolecular proportions of the monomers. These copolymers may satisfactorily be prepared as disclosed in U.S. Patent No. 3,300,459.

Other useful polymeric materials of this type are the elastomeric compounds or terpolymers produced by the addition copolymerization of ethylene and propylene monomers with a minor proportion of an unconjugated diene, commonly called ethylene-propylene terpolymers, or ethylene-propylene-diene terpolymers.

Various unconjugated diene monomers have been used to produce these terpolymers, such as dicyclopentadiene, 1:4 hexane-diene, methylene norbornene and the like. Of course, various other suitable unconjugated diene monomers would be apparent to those skilled in the art and the particular choice of said monomers is not critical.

Illustrative of terpolymers particularly useful in the practice of this invention are those formed by the polymerization of ethylene and propylene monomers and 1:4 hexanediene type unsaturated monomers. A preferred terpolymer of this type which has been found satisfactory contains approximately 53% (by weight) ethylene and has approximately 1%–5% unsaturation.

Alternatively, a polymeric material for the preparation of a stabilized dispersion which has been found satisfactory is the product produced by the partial depolymerization of the ethylene-propylene copolymers and the ethylene-propylene terpolymers described above.

These partially depolymerized materials may be prepared using conventional techniques, for example, from the high molecular weight copolymers or terpolymers by heat treatment in inert atmosphere in a manner similar to that described in British Patent No. 1,001,455; or in reactive atmospheres (air or low oxygen content gas mixtures), or in the presence of catalysts to promote chain breaking or scission, with or without kneading of the heated polymeric mass.

The depolymerization should be conducted in such a fashion that the polymeric structure is not chemically altered other than by chain scission action to thereby produce a lower molecular weight (and lower viscosity) polymer of the same structure as the starting material. Depolymerization is carried out to an extent which produces a material of suitable viscosity. The resulting lower molecular weight polymers may be evaluated by viscosity measurements, and infrared examination to establish that the basic polymeric structure has not been altered.

It has been found that these partially depolymerized ethylene-propylene copolymers and partially depolymerized ethylene-propylene terpolymers, or mixtures thereof, are the most useful stabilizing agents because the lower viscosity materials can be more readily used, handled, and processed, and do not impart undesirably high viscosity to the end products.

The viscosities for the most useful stabilizing agents range in value from about 50 poises to about 500 kilopoises on a preferred basis. Broadly stated, the viscosity may range from about 10 poises minimum to an upper level limited only by ability to mix the polymer conveniently in rubber processing equipment, that is approximately 100 Mooney viscosity ML (1+4) at 100° C. By this, it is meant a viscosity of 100 Mooney determined at 100° C., large rotor, heating time one minute, with the reading taken after four minutes.

The amount of stabilizing agent required to produce satisfactory dispersions varies with the size and type of the particles to be dispersed and the character of the dispersion medium. In general, it has been found that satisfactory dispersions can be produced with a minimum ratio of stabilizing agent to particles of about 5% by weight. Suitable dispersions have also been produced using ratios as high as about 100%, by weight. Such high ratios are not essential for most pigments or oils, and satisfactory dispersions can be made at lower levels with the added advantages of reduced material costs and easier processing conditions. The preferred ratios of stabilizer to pigments are about 10% to about 40% by weight.

The types of solid particulate materials which can be processed into stable dispersion by means of this invention are: solid lubricants and tinctorial pigments and fillers. The solid lubricant group includes the lubricants: molybdenum disulfide, tungsten disulfide, boron nitride, lead sulfide, and the like. The tinctorial pigments and fillers which have been successfully dispersed include carbon blacks (both fine-particle channel blacks and the coarser thermal blacks), titanium dioxide, talc, mica, and the like.

The size of the particulate materials should generally be finer than No. 100 U.S. standard sieve (that is, 149 microns). For lubricating purposes dispersions containing solid lubricant particles below about 75 microns are most effective. For most effective color development, the use of tinctorial pigments with a particle size below about 10 microns is preferred. If extreme freedom from settling is important the particle size should be about 1 micron or below.

Although the polymeric materials of this invention are useful primarily as stabilizing agents, during the mixing process limited disintegration of the lubricant or pigment particles, and particularly aggregates of said particles, may occur under rigorous mixing conditions.

The preferred method of forming stable dispersions by this method utilizes processing techniques which give high content dispersions, generally at 10%–75% (by weight) particles in a fluid carrier, but this may be varied over a wide range. The carrier is a substantially organic material, normally petroleum oil, but other carriers have been found to be satisfactory, including vegetable oils such as rapeseed oil, liquid hydrocarbons such as aliphatic petroleum naphthas and aromatic petroleum naphthas, and the like. These high content dispersions or concentrates are normally diluted with additional amounts of fluid to particle content levels of about 0.001% to about 15% for most uses. The diluent can be the same material used as the concentrate carrier, or miscible materials such as other petroleum oils or oil blends, greases, other liquid hydrocarbons, and the like.

Those skilled in the art will realize that the particular carrier or carriers used may vary widely and the choice thereof is not critical.

Various test methods have been proposed to evaluate the stability properties of pigment-oil dispersions, such as long-term storage tests (for various times and under various storage conditions), long-term use tests, etc. It has been found that useful comparative results can be obtained in the laboratory in reasonable periods of time of two standardized elevated temperature tests, which are detailed below.

Hot oil stability test

The pigment-oil dispersion is diluted with a series of reference oils to a uniform content of approximately 0.2 percent by weight. The diluted dispersion is heated and maintained in an open, substantially full, 1¼-ounce glass jar at a temperature of 160°±2° C. for 20 hours. At the end of this period, the dispersion is examined visually at 160° C., and microscopically at room temperature to determine its stability at extreme temperature.

To make the visual examination, a metal spatula is dipped one inch into the hot material and withdrawn, without agitating or unduly disturbing the sample. The oil film on the spatula blade is observed. If the film is colored and opaque, the sample is allowed to cool and examined further by microscope, avoiding agitation or shear as far as possible. If no aggregates, or aggregates of a very few particles, are found, the material is rated as acceptable, but the presence of chains of flocculated particles indicates unsatisfactory stability. The stability may be judged as unsatisfactory based only on the spatula observation if the oil film is clear, indicating flocculation and settling of substantially all the particles.

*Simulated life tests*

The pigment-oil dispersion is diluted with a series of reference oils to a uniform content of approximately 0.2 percent by weight. One percent water is added to the diluted dispersion and it is heated and maintained at a temperature of 120° C.±1° C. and examined daily.

This daily examination is performed using a spatula in the manner described in the "Hot Oil Stability" tests. The time in days at which failure, as indicated by a clear oil film, occurs is recorded as the "life" in days. This test gives an indication of the useful life of the dispersion.

The diluting (reference) oils used in these tests have a pronounced effect on the results obtained. In the full evaluation tests of stabilizers culminating in this invention, more than 30 commercially available refinery oils and proprietary internal combustion engine crankcase oils were used as the diluting oils for these elevated temperature tests. In this specification, however, we report only the results obtained with three oils illustrative of three flocculating ability levels:

Oil "A"—a solvent refined neutral hydrocarbon oil with normal flocculating properties. (500 SSU at 100° F.)

Oil "B"—a medium duty, medium additive level, proprietary (premium grade) internal combustion engine crankcase oil with high flocculating properties.

Oil "C"—a heavy duty, high additive content, proprietary (premium grade) internal combustion engine crankcase oil with extremely strong flocculating properties.

The test results reported in this specification are based upon tests using these three oils, and give an evaluation of the superior stabilizing ability of the stabilizers of this invention under various conditions of use. The results obtained from evaluation tests with the other oils gave comparable results.

EXAMPLE I

One hundred parts of molybdenum disulfide with an average particle size below 1 micron was placed in a double arm internal mixer with 15 parts of a partially depolymerized ethylene-propylene copolymer (viscosity of 110 kilopoises) using as a source material the copolymer of Example V. The combination, which had the consistency of a stiff paste, was mixed for 6 hours. At the end of this time 80 parts of a solvent neutral petroleum oil (500 SSU at 100° F.) were added to the mixture in small increments, mixing between the additions, and further mixing 15 minutes at the end of the addition period to insure uniformity of the dispersion. The dispersion removed from the mixer was in the form of a viscous fluid, which was evaluated by diluting this concentrated dispersion with test oils and subjecting these dilutions to the "hot oil stability test" and the "simulated life test." The satisfactory results of these tests are included in Table I.

EXAMPLE II

A concentrated dispersion of molybdenum disulfide in oil was prepared as in Example I, except that 15 parts partially depolymerized ethylene-propylene copolymer, with a viscosity of 52 kilopoises, was used. The other ingredients and processing conditions were the same.

The satisfactory test results obtained from this dispersion are reported in Table I.

EXAMPLE III

Another dispersion was prepared in equipment and in a manner similar to Example I except that the partially depolymerized ethylene-propylene copolymer had a viscosity of 0.12 kilopoises and 20 parts petroleum oil was added to the mixer initially at the same time as the copolymer. After the 6-hour milling period, additional oil was added as in Example I. The superior results obtained are reported in Table I.

EXAMPLE IV

Another dispersion was prepared as in Example III except that the stabilizing agent used was 15 parts of ethylene-propylene terpolymer (viscosity of very approximately 100,000 kilopoises), containing 53% ethylene, 2–3% unsaturation from the diene monomer, which was of the 1:4 hexane diene type, commercially designated as "Nordel 1040," and 30 parts of the petroleum oil was added to the mixer at the same time as the terpolymer.

The satisfactory results obtained with this dispersion are reported in Table I.

EXAMPLE V

A dispersion was prepared as in Example IV except that the polymeric stabilizer used was 15 parts of ethylene-propylene copolymer (viscosity of very approximately 100,000 kilopoises). The copolymer with an ethylene:propylene ratio of approximately 1:1 is the source material used to produce the partially depolymerized copolymer used in Example I.

The satisfactory results obtained with this dispersion are reported in Table I.

EXAMPLE VI

A dispersion was prepared as in Example III except that 15 parts of partially depolymerized ethylene-propylene copolymer (viscosity of 110 kilopoises) was used and the oil used was a blend of solvent neutral petroleum oils (approximately 50% of a 150 SSU at 100° F. oil and 50% of a 500 SSU at 100° F. oil). The dispersion obtained was evaluated and the results are shown in Table I.

TABLE I

|  | OIL "A" | | OIL "B" | | OIL "C" | |
| --- | --- | --- | --- | --- | --- | --- |
|  | Hot oil stability | Simulated life, days to failure | Hot oil stability | Simulated life, days to failure | Hot oil stability | Simulated life, days to failure |
| The best commercially available molybdenum disulfide dispersion. | Failed | 8 | Good | 5 | Failed | 3 |
| Example I | Good | Over 28 | do | Over 28 | Fair | 28 |
| Example II | do | do | do | do | do | 12 |
| Example III | do | 9 | do | do | Failed | 5 |
| Example IV | do | 24 | do | do | Good | 6 |
| Example V | do | 16 | do | do | Fair | 6 |
| Example VI | do | 28 | do | do | Good | 16 |

This table of results shows the superior stability of the dispersions prepared in accordance with this invention as compared to the best commercially available oil-molybdenum disufide dispersion previously known. This superiority is shown by the consistent significant increase in life observed in the "Simulated Life Test." In most oils the "Hot Oil Stability" is also significantly improved following my invention. This test is particularly stringent in Oil "C," and it has been difficult, if not impossible, before this invention, for any molybdenum disulfide-oil dispersion to pass the test in this oil. The superior results obtained by this invention are indicated by the fact that we have succeeded in formulating a number of dispersions which resist even these extreme conditions.

Similar satisfactory molybdenum disulfide dispersions were prepared using larger particle size molybdenum disulfide and aliphatic petroleum naphthas, aromatic petroleum naphthas, and polypropylene glycol oil as the carrier fluids.

EXAMPLE VII

A dispersion was prepared by mixing boron nitride particles on a muller with partially depolymerized ethylene-propylene copolymer (viscosity of 50 kilopoises), and a solvent neutral petroleum oil (500 SSU at 100° F.).

This dispersion was satisfactory when made, and satisfactory after being subjected to the "Hot Oil Stability Test."

EXAMPLES VII (A-F)

Dispersions were prepared as in Example VII using the following pigments:
(A) Titanium dioxide,
(B) High color channel carbon black,
(C) Medium thermal carbon black,
(D) Talc,
(E) Lead sulfide,
(F) Mica.

All of these dispersions were satisfactory when tested for dispersion quality and stability.

EXAMPLE VIII

A dispersion was prepared as in Example VII using tungsten disulfide particles. A satisfactory dispersion was prepared which successfully passed the "Hot Oil Stability" test.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:
1. A dispersion composition comprising:
(a) at least one solid particulate material, present in an amount between about 0.001% and about 75% by weight of the composition, said particulate material being selected from the group consisting of:
(1) lubricant particles selected from the group of molybdenum disulfide, tungsten disulfide, boron nitride and lead sulfide, or
(2) pigment and filler particles selected from the group of titanium dioxide, carbon black, talc and mica,
(b) a polymethylene polymer having a saturated main carbon chain, said polymer being selected from the group consisting of
(1) copolymers of ethylene and propylene, said copolymers containing a methyl group substitution rate on the chain averaging about one methyl for every four carbon atoms in said chain,
(2) terpolymers of ethylene, propylene and an unconjugated diene monomer, said terpolymers containing substituted groups on the chain averaging about one group for every four carbon atoms in said chain, said groups being selected from the class consisting of said diene and methyl groups, and
(3) mixtures of said copolymers and terpolymers, said polymethylene polymer being present in an amount between about 5% and about 100% by weight of the particulate material present, said polymer having a viscosity of at least about 10 poises,
(c) a fluid carrier material as the balance of the composition.

2. The composition of claim 1 wherein said particulate material has a particle size finer than about 149 microns, and consists of molybdenum disulfide.

3. The composition of claim 1 wherein said particulate material has a particle size finer than about 75 microns.

4. The composition of claim 1 wherein said viscosity has a value between about 50 poises and about 500 kilopoises.

5. The composition of claim 1 wherein said particulate material is present in an amount between about 0.001% and about 15% by weight.

6. The composition of claim 1 wherein said polymer is present in an amount between about 10% and about 40% of the particulate material present.

7. The composition of claim 1 wherein said particulate material has a particle size finer than about 149 microns, and said viscosity has a value between about 50 poises and about 500 kilopoises.

8. The composition of claim 7 wherein said particulate material is present in an amount between about 0.001% and about 15% by weight.

9. The composition of claim 8 wherein said polymer is present in an amount between about 10% and about 40% of the particulate material present.

10. The composition of claim 1 wherein said polymer is selected from the group consisting of a copolymer containing approximately equimolar proportions of ethylene and propylene, and a terpolymer of ethylene, propylene, and 1,4-hexanediene, said terpolymer containing about 53% by weight ethylene and having approximately 1% to 5% unsaturation.

References Cited

UNITED STATES PATENTS 3,300,459  1/1967  Natta et al. _____ 260—88.2

FOREIGN PATENTS 795,957  6/1958  Great Britain.

DANIEL E. WYMAN, *Primary Examiner.*

I. VAUGHN, *Assistant Examiner.*